Feb. 18, 1958

C. C. CUTLER 2,824,260

DIRECT VIEW STORAGE TUBE

Filed Sept. 12, 1956

INVENTOR
C. C. CUTLER
BY David P. Kelley
ATTORNEY

United States Patent Office 2,824,260

Patented Feb. 18, 1958

2,824,260

DIRECT VIEW STORAGE TUBE

Cassius C. Cutler, Gillette, N. J., assignor to Bell Telephone Laboratories, Incorporated, New York, N. Y., a corporation of New York Application September 12, 1956, Serial No. 609,383

14 Claims. (Cl. 315—13)

Figure 1:
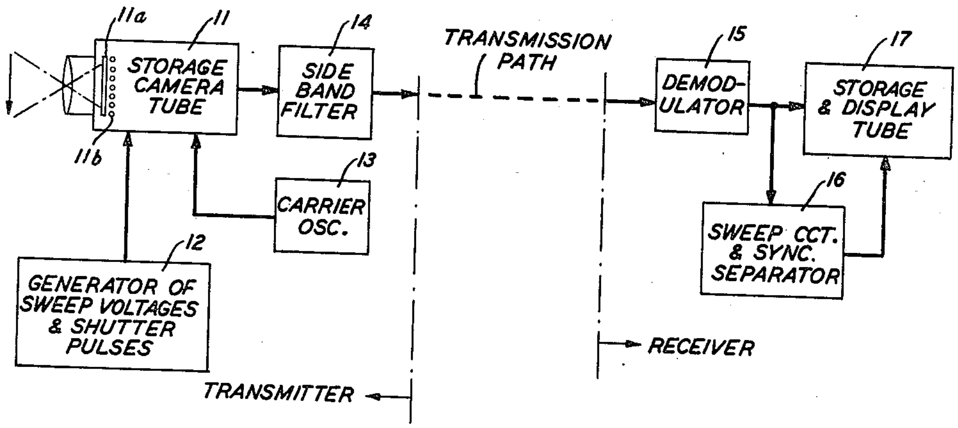

This invention relates to cathode ray picture tubes and, more particularly, to such a tube which is capable of displaying a picture derived from a low bandwidth television signal such as may be transmitted over existing telephone lines.

Much thought has been directed to the application of the television medium to our present day telephones so that one may see as well as hear the other party in a telephone conversation. The advantages of such an arrangement in both industry and the home are readily apparent. It would, for instance, make more effective the transmission of scientific information since a drawing could be transmitted simultaneously with a conversation. It would also make possible visual inspection by a doctor of physical manifestations of an injury while his patient described over the telephone the associated discomforts. Obviously, a multitude of other uses and advantages are inherent in such a system. However, one of the major problems attending the adaptation of television to present telephones has been the large bandwidth requirements of most television signals for an acceptable image presentation. This precludes the transmission of these signals over existing low bandwidth capacity telephone lines.

One solution which has been proposed is the transmission of a succession of still pictures, each of which lasts about one second. Such a succession of pictures can be transmitted over existing telephone lines since the bandwidth requirements are sufficiently low (no more than 4000 cycles) and, further, the solution is considered to be practicable since a succession of one-second still pictures will give satisfactory image presentation to the telephone viewer in virtually all situations. However, implementation of this technique and a consequent realization of the union of television and telephone have been forestalled by the need for a practical tube which is capable of displaying such a succession of pictures without annoying interruption between successive pictures.

Attempts to satisfy this need have resulted in a display device comprising two complete cathode ray tubes and an optical arrangement for combining the images appearing on the screens of the two tubes, as disclosed in a copending application Serial No. 525,927, filed August 2, 1955, by M. A. Clark, R. L. Miller, and R. W. Sears. In the operation of this device, there is provided switching means for connecting the input signal to one tube during one picture and to the other tube during the next picture, so that alternate pictures appear on the screens of alternate tubes The first picture is stored on one tube and then that picture is viewed as the next picture is being stored on the second tube. This process continues, each picture being viewed as the next is being stored, thus permitting the display of an uninterrupted sequence of pictures. Additionally, for viewing convenience the pictures of the two tubes are combined optically for presentation on a single viewing screen. This latter optical arrangement for combining the pictures of the two tubes requires additional switching means for blanking the output of each tube at times when viewing of the picture from the other tube is to be had. This device is sound in principle but it has a serious disadvantage in that it requires two tubes, extensive switching apparatus, and a suitable optical arrangement for combining the picture output from the two tubes.

Another picture tube arrangement for displaying an uninterrupted sequence of pictures is disclosed in a copending application, Serial No. 545,164, filed November 7, 1955, by M. E. Hines and W. E. Kirkpatrick. This arrangement disadvantageously requires extensive switching circuitry.

It is a general object of this invention to achieve the display of an uninterrupted sequence of still pictures in a single tube in a simplified manner without extensive external switching circuitry.

To this end a feature of the present invention is a cathode ray tube employing a pencil electron beam which is swept over a storage surface in an interlaced scanning pattern for storing on that surface the signal elements of two complete pictures, one during each of the two interlaced fields of the pattern. Additionally, there is employed a flooding beam for conveying to a viewing screen first one of the stored pictures and then the other. In operation, as the pencil beam is storing a picture in one field, the flooding beam allows viewing of the picture in the other field and so one picture may be viewed as the next is being stored and an uninterrupted sequence of pictures is presented.

In one embodiment of the present invention, there is provided a first electron gun for generating a pencil beam and a second electron gun for generating a flooding beam. In addition, there is provided in turn along the path of the flooding beam a modulating grid for receiving an input signal to be viewed, a storage grid, control electrodes for appropriately restricting passage of the flooding beam, an accelerating grid, and a luminescent viewing screen. The pencil beam is caused to scan the storage grid in an interlaced pattern, the entire group of scanning lines in such a pattern consisting of two interlaced sets each of which is commonly referred to as a field. While the beam is scanning the storage grid in this fashion, an input signal is applied to the modulating grid and the voltage variations on this grid appear as a space charge pattern on the storage grid. The input signal is synchronized with the beam scanning rate in such a manner that one complete picture is stored on one of the two interlaced fields and a second picture is stored on the second field. When storage of the first picture is completed and storage of the second picture commencing, the D.-C. potential on the control electrodes is adjusted to permit passage of those portions of the flooding beam which have been modulated by the first field but to prohibit passage of those portions of the flooding beam which have been modulated by the second field; thus only the first picture is conveyed to the viewing screen. Alternately, when storage of the second picture is completed and storage of a third picture is commencing on the first field, the D.-C. potential of the control electrodes is adjusted to permit passage of those portions of the flooding beam which have been modulated by the second field but to prohibit passage of those portions which have been modulated by the first field and so only the second picture appears on the viewing screen. In this manner the sequence of still pictures is displayed without perceptible interruption between successive pictures.

Figure 2:
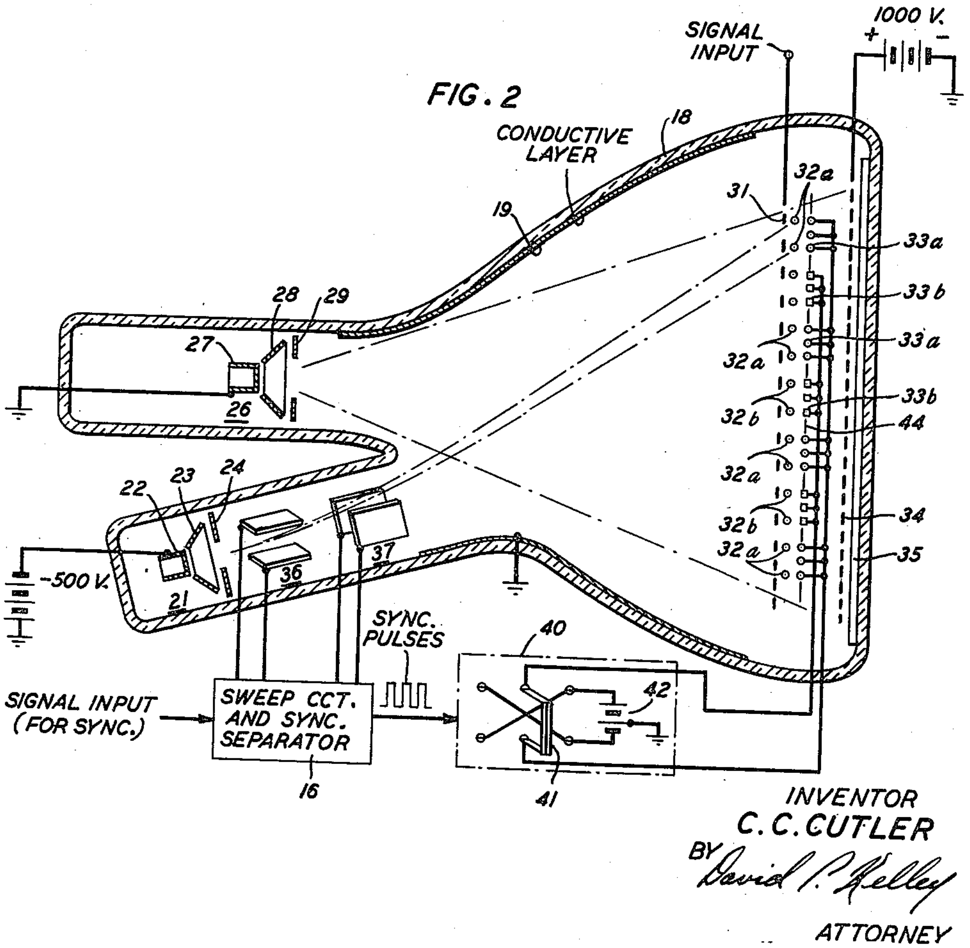

This invention will be understood more clearly from the following detailed description taken together with the accompanying drawing in which:

Fig. 1 shows a block diagram of a television system of the type in which a tube embodying the principles of the present invention is presently intended to be used; and Fig. 2 shows a longitudinal sectional view of a cathode ray tube embodying the principles of the present invention.

Referring now more particularly to the drawing, Fig. 1 shows a television system in which the display tube of the present invention may advantageously be employed. This system includes at its transmitter end a camera tube 11 of the storage type, a generator 12 for supplying sweep voltages and shutter pulses to the camera tube, an oscillator 13 for supplying a carrier signal to the camera tube, and a sideband filter 14 coupled to the output of the camera tube.

For present purposes it will be sufficient to describe briefly the operation of this transmitter without describing in detail various known circuits for performing the functions of the various blocks. In operation, a light image appears on a photosensitive mosaic surface 11*a* of the camera tube 11. This tube includes a grid 11*b* which is spaced in close proximity to its photosensitive mosaic and is normally biased a few volts negative with respect to the mosaic for preventing the escape of photoelectrons. Positive shutter pulses of about 20 volts amplitude are applied to this grid from generator 12. Each time such a pulse appears on the grid photoelectrons are permitted to escape from the mosaic at a rate determined by the illumination of the light image. Thus during each shutter pulse a charge pattern corresponding to the light image is stored. This stored pattern remains on the mosaic surface until the next shutter pulse is supplied, at which time a new image pattern is stored. In the interim between successive shutter pulses the mosaic surface is scanned by an electron beam to produce a signal whose variations correspond to the stored image. Camera tubes which operate in this manner are known in the prior art, one such tube being the typical iconoscope film pickup tube. The signal derived in tube 11 modulates a carrier wave from oscillator 13 and the modulated carrier thus formed is passed through filter 14 to obtain a single sideband signal for transmission. Advantageously, the time interval between successive shutter pulses is one second or more, so that the scanning rate of each image on the mosaic surface can be relatively slow. Such a slow scanning rate results in the transmission of fewer signal elements in a fixed time and a consequent reduction in the bandwidth required for signal transmission. By this technique transmission of television signals over present day telephone lines can be accomplished.

This technique of storing an image and scanning it slowly, then storing a second image and scanning it slowly, and so forth, results in a signal which corresponds to a succession of still images, each of which has a duration equal to the interval between successive shutter pulses, which has been chosen by way of example to be one second. This one second duration is also a measure of the frame time of the camera tube since in that time the image on the mosaic storage surface is completely scanned.

At the receiver end of the transmission system of Fig. 1, there is provided a demodulator 15 for eliminating the carrier wave from the television signal received, suitable sweep circuits and a sync separator shown by block 16, and a storage type display tube 17 in accordance with the present invention. As the television signal derived from demodulator 15 is applied to display tube 17, an electron beam of the display tube is swept over a storage grid in an interlace scan. The voltage for sweeping the beam in this manner is provided by the sweep circuits of block 16. The scanning rate is synchronized with the television signal, which as indicated above corresponds to a succession of still pictures, so that one picture is stored on each field of the interlace scan. This synchronization is accomplished by sending with the television signal from the transmitter a pulse train which is synchronized with the transmitter frame rate, for example the train of shutter pulses, then separating these pulses from the signal at the receiver by a conventional sync separator circuit, shown by block 16, and applying them to the sweep circuits.

One specific illustrative embodiment of the display tube of the present invention is depicted in Fig. 2 as comprising an evacuated envelope 18, typically made of glass and coated on its interior by a conductive material 19 to prevent accumulation of any undesired localized charge on the glass surface, a first electron gun 21, a second electron gun 26, and several electrodes at the opposite end of the tube. The first gun comprises a cathode 22, beam forming electrode 23, and accelerating anode 24 for providing a pencil beam. The second gun 26 similarly comprises a cathode 27, beam forming electrode 28, and accelerating anode 29 for providing a flooding beam. This flooding beam is directed toward the screen end of the tube, and spaced in a longitudinal direction along its path are a modulating grid 31, a storage grid 32, control electrodes 33, an accelerating anode 34, and a luminescent screen 35. All of these elements lie in substantially parallel planes. The storage grid 32 consists of a succession of fine wire-like metallic elements 32*a*, 32*b* covered with an insulating layer such as silica or magnesium fluoride a few microns thick.

In operation, cathode 22 is maintained at a potential slightly positive with respect to beam forming electrode 23 but substantially negative with respect to accelerating anode 24 and to the various elements at the screen end of the tube for projecting a high velocity pencil beam toward the screen end. This beam passes through deflection plates 36 and 37, which are mutually perpendicularly disposed and are supplied with a voltage from suitable sweep circuits, for sweeping the beam across storage grid 32 in an interlaced scan. As is characteristic of interlaced scanning, the beam first scans the storage grid along one set of lines and then along a second set, the lines of each of these sets being interleaved or interlaced between those of the other set. Each of these sets of lines is herein referred to as a field. It will be assumed for the purposes of explanation that each line includes two wire-like elements of the storage grid, that is, that the pencil beam is wide enough at the storage grid to intercept two elements. Thus on one field it first scans elements 32*a*, and on the other field it scans elements 32*b*. As the pencil beam is scanning in this manner, an input signal is applied to the modulating grid 31 of the display tube. Each elemental area of the storage grid as it is struck by the scanning beam charges to the instantaneous potential of the modulating grid and so the signal applied to that grid is translated to a space charge pattern on the storage grid elemental area. This stored charge pattern is then translated to an image on luminescent screen 35 by the action of the flooding beam which is projected past the various tube elements. The flooding beam is slow moving as it arrives at the storage grid since cathode 27 of the flooding beam gun is maintained at substantially the same D.-C. potential as modulating grid 31. Such a slow moving beam is density modulated as it passes the space charge pattern on the storage grid, in a manner similar to the modulation achieved by electrons passing the control grid of a conventional triode. The electrons so modulated then encounter control electrodes 33 which serve to permit passage of certain of the electrons and prohibit passage of others. The ones passed by these control electrodes are next accelerated by anode 34 and strike viewing screen 35 at speeds sufficient to produce an image.

In practice, the interlaced scanning of the pencil beam is synchronized with the input signal, for example by use of the transmitter camera tube shutter pulses which are separated from the input signal and applied to a conventional sweep circuit in block 16, so that a charge pattern corresponding to two complete pictures is stored on grid 32, one on the interlaced field including lines 32*a* and the other on the interlaced field including lines 32*b*. After the elements of the first picture are stored on one field, for example the field including lines 32*a*, then viewing of that first picture will be had while the pencil beam is scanning the other field to store the second picture. However, during viewing of the first picture, viewing of the second picture which is then being stored must be prevented. This is accomplished, in accordance with the present invention, by properly adjusting the D.-C. potential on the various control electrodes 33. In particular, the D.-C. potential of the control electrodes aligned with lines 32*a* is adjusted to permit passage of electrons of the flooding beam but the D.-C. potential of the control electrodes aligned with lines 32*b* is adjusted to prevent passage of the electrons of the flooding beam. Accordingly, only those portions of the flooding beam which have been modulated by the first picture are permitted to pass and so the first picture appears on the screen. After the second picture is stored, the pencil beam again scans the first field to store a third picture. The storage is preferably of the equilibrium type wherein the first picture is erased as the third picture is stored thereby eliminating the need for a separate erasing step. In storage of this type the storage surface charges to the voltage of the applied signal, irrespective of its initial charge and thus the initial charge is effectively erased. During storage of this third picture, the D.-C. potential on control electrodes is switched to permit passage only of those portions of the flooding beam which have been modulated by the charge pattern on lines 32*b*; hence the second picture appears on the viewing screen.

The control electrodes 33 have been shown as two interleaved grids 33*a* and 33*b*. To facilitate distinguishing between the two control grids, the electrodes of grid 33*a* have been shown to have a circular cross section and those of control grid 33*b* to have a square cross section. In practice these electrodes will customarily all have the same shape. It will be seen that the electrodes of control grid 33*a* are aligned with storage elements 32*a* while the electrodes of control grid 33*b* are aligned with storage elements 32*b*. All of the electrodes of control grid 33*a* are connected by a common D.-C. bus and joined to one side of arm 41 of switch 40, and all the electrodes of control grid 33*b* are connected by a different common D.-C. bus and joined to the other side of arm 41 of the switch. For purposes of simplification switch 40 has been shown as a manually operated switch which has its lower two terminals connected across a 10 volt battery 42 in one polarity and its upper two terminals likewise connected to the 10 volt battery but in the opposite polarity. The switch is actuated by the transmitter camera tube shutter pulses which have been separated from the input signal by conventional circuitry in block 16 and so operates in synchronism with the frame time of that tube. In practice the switch may be of any suitable type, such as one of various known electronic switches, and the battery may be a suitable D.-C. voltage source, or alternatively the switch and D.-C. voltage source can be replaced by a suitable A.-C. signal whose periodicity is synchronous with the frame time of the transmission camera tube. In the latter alternative the positive-going and negative-going half-cycles of the signal would serve respectively to permit passage and prevent passage of the flooding beam. With arm 41 of the switch connected to the left two terminals as viewed in the figure, control grid 33*a* is maintained at 5 volts positive and control grid 33*b* at 5 volts negative by battery 42. Hence electrons of the flooding beam in the vicinity of control grid 33*a* are permitted to pass but those in the vicinity of control grid 33*b* are prevented from passing. Likewise, with switch arm 41 connected to the right two terminals as viewed in the figure, control grid 33*a* will be at 5 volts negative and control grid 33*b* at 5 volts positive and only electrons in the vicinity of this latter grid can pass. Since the switch arm is synchronous with the frame time of the camera tube and, in turn, with the scanning rate and field time of viewing tube 17, as the pencil beam scans field 32*a* only the flooding beam electrons which have passed field 32*b* reach viewing screen 35 and, similarly, as the pencil beam scans field 32*b*, only the flooding beam electrons which have passed field 32*a* reach the viewing screen. In this manner viewing of one picture is had as writing of the following one is taking place and hence an uninterrupted sequence of pictures is achieved.

Interference between two successive pictures is prevented by shielding members 44 which are spaced between the electrode groups of control grid 33*a* and those of control grid 33*b*. These members serve to intercept any electrons of the flooding beam which neither pass through a line of field 32*a* or a line of field 32*b* but, rather, pass through the space between adjacent lines of the two fields. Such electrons tend to be modulated by the adjacent lines of both fields. Hence they would have a deleterious effect on the image if allowed to continue to the viewing screen. To prevent this, shielding members 44, which are preferably of conductive material, present a physical obstruction to the passage of such electrons.

It is understood that the specific embodiment described is merely illustrative of the general principles of the present invention. Various other arrangements may be devised in the light of this disclosure by one skilled in the art without departing from the spirit and scope of this invention. For example, in the described embodiment the input signal is applied to a modulating grid adjacent the storage grid. However, it will be apparent to a worker skilled in the art that storage may be had by applying the input signal to modulate the pencil beam, for example by applying the input signal to beam forming electrode 23 of the pencil beam gun. In such a case the modulated beam serves to impart a charge pattern to the storage grid in accordance with the variations of the applied signal. Additionally, in the described embodiment the control electrodes are positioned on the screen side of the storage grid and so they act to stop or pass selected electrons of the flooding beam after they have become modulated by the charge pattern on that grid. However, they can be positioned on the opposite side of the storage grid and so control the passage of the flooding beam electrons before they are modulated. Other changes will appear to one skilled in the art.

What is claimed is:

1. A cathode ray tube comprising a first electron gun at one end of the tube for producing a flooding beam and for directing said flooding beam lengthwise of said tube along a predetermined path, a luminescent screen extending athwart said flooding beam at the other end of said tube, a storage grid interposed between said screen and said electron gun and also extending athwart the flooding beam, a second electron gun for producing a pencil beam and for projecting said pencil beam against the surface of said storage grid, deflection means for sweeping said pencil beam across the surface of said storage grid in an interlaced scan whereby there is stored a charge pattern in two interlaced fields during one complete scan of the surface, and means for alternately permitting passage of electrons of the flooding beam which are directed at the first of said interlaced fields while preventing passage of electrons of said flooding beam directed at the second interlaced field and then preventing passage of electrons of said flooding beam which are directed at the first field while permitting passage of electrons of said beam directed at the second field, said last-mentioned means including a plurality of control electrodes adjacent the storage grid and potential means connected to said control electrodes for increasing the potential of certain ones of said control electrodes while decreasing the potential of the others and then decreasing the potential of said certain ones while increasing the potential of said others.

2. The combination of elements set forth in claim 1 wherein said plurality of control electrodes comprises two sets, the first being aligned with the first interlaced field and the second being aligned with the second interlaced field and said potential means connected to said control electrodes operates to increase the potential of the first set while decreasing the potential of the second and then to decrease the potential of the first set while increasing the potential of the second.

3. A cathode ray tube comprising a first electron gun at one end of the tube for producing a flooding beam and for directing said flooding beam lengthwise of said tube along a predetermined path, a luminescent screen extending athwart said flooding beam at the other end of said tube, a storage grid interposed between said screen and said electron gun and also extending athwart said flooding beam, a second electron gun for producing a pencil beam and for projecting said pencil beam against the surface of said storage grid, electron deflecting means for sweeping said pencil beam across the surface of said storage grid in an interlaced scan whereby there is stored a charge pattern in two interlaced fields during one complete scan of the surface, a plurality of control electrodes adjacent the storage grid and potential means for biasing said control electrodes to permit the passage of flooding beam electrons which are directed at the first of said two interlaced fields and prevent the passage of flooding beam electrons which are directed at the second interlaced field while the pencil beam is scanning said second field and to prevent the passage of flooding beam electrons which are directed at the first interlaced field and permit the passage of flooding beam electrons which are directed at the second interlaced field while the pencil beam is scanning said first field.

4. A cathode ray tube for viewing successively stored images comprising a storage grid having a plurality of storage elements divided into two groups, a luminescent screen on one side of said storage grid, first electron gun means on the other side of said storage grid for scanning the storage elements thereof, second electron gun means for projecting a flooding beam simultaneously past all said storage elements, first control electrode means positioned between one group of said storage elements and said luminescent screen, and second control electrode means positioned between the other group of said storage elements and said luminescent screen.

5. A cathode ray tube in accordance with claim 4 further comprising a modulating grid positioned adjacent said storage grid and between said storage grid and said first electron gun means.

6. A cathode ray tube in accordance with claim 5 further comprising means for applying an input signal to said modulator grid and means for alternately pulsing said first and second control electrode means.

7. A cathode ray tube comprising a luminescent screen, a first electron gun for producing a flooding beam and for projecting said beam along a predetermined path for interception by said screen, a storage grid extending substantially transversely across said beam at a position between said gun and said luminescent screen, a second electron gun for producing a pencil beam and for projecting said beam for interception by said storage grid, electron deflection means for sweeping said pencil beam across the surface of said storage grid in an interlaced scan whereby there is stored on said grid a charge pattern in two interlaced fields during one complete scan of said surface, and means including a plurality of control electrodes adjacent said storage grid for alternately preventing passage of the electrons of the flooding beam which are directed at the first of said two interlaced fields while permitting passage of electrons of said flooding beam directed at the second interlaced field and then permitting passage of electrons of said beam which are directed at said first field while preventing passage of electrons of said beam which are directed at said second field.

8. A cathode ray tube comprising a luminescent screen, a first electron gun for producing a flooding beam and projecting said beam along a predetermined path for interception by said screen, a storage grid extending substantially transversely across said beam at a position between said gun and said luminescent screen, a modulating grid extending substantially transversely across said flooding beam and positioned adjacent the control grid and said electron gun for receiving an input signal, a second electron gun for producing a pencil beam and for projecting said beam for interception by said storage grid, electron deflection means for sweeping said pencil beam across the surface of said storage grid in an interlaced scan whereby there is stored on said grid a charge pattern in two interlaced fields during one complete scan of said surface, and means including a plurality of control electrodes adjacent said storage grid on the opposite side from said modulating grid and similarly extending substantially transversely across the flooding beam for alternately preventing passage of the flooding beam electrons which have passed the first of said two interlaced fields while permitting passage of flooding beam electrons which have passed the second interlaced field and then permitting passage of said flooding beam electrons which have passed said first field while preventing passage of electrons of said flooding beam which have passed the second field.

9. A cathode ray tube comprising a first electron gun for producing a flooding beam and for projecting said beam along a predetermined path, and, spaced in turn along said path, a modulating grid for receiving an input signal, a storage grid, a plurality of control electrodes lying in a plane substantially parallel to said storage grid, an accelerating anode, and a luminescent screen; a second electron gun for producing a pencil beam and for projecting said pencil beam against said storage grid, deflecting means for sweeping said pencil beam across the surface of said storage grid in an interlaced scan whereby there is stored a charge pattern in two interlaced fields during one complete scan of said surface, which charge pattern corresponds to the variations in the input signal, and means for alternately increasing the potential of certain ones of the plurality of control electrodes while decreasing the potential of the others for permitting passage of the flooding beam electrons which have passed the first of said interlaced fields while preventing passage of the flooding beam electrons which have passed the second interlaced field, and then decreasing the potential of said certain control electrodes while increasing the potential of the others for preventing passage of flooding beam electrons which have passed said first interlaced field while permitting passage of flooding beam electrons which have passed the second interlaced field.

10. A cathode ray tube comprising a luminescent screen, a first electron gun for producing a flooding beam and projecting said beam along a predetermined path for interception by said screen, a storage grid extending substantially transversely across said flooding beam at a position between said gun and said luminescent screen, a second electron gun for producing a pencil beam and for projecting said pencil beam for interception by said storage grid, electron deflection means for sweeping said pencil beam across the surface of said storage grid in an interlaced scan whereby there is stored on said grid a charge pattern in accordance with signal variations of an applied television signal whose elements correspond to a succession of still pictures, means for synchronizing the scanning rate with said television signal for storing two complete pictures on each scan, one in the first interlaced field of said scan and the other in the second interlaced field of said scan, and means including a plurality of control electrodes adjacent said storage grid for alternately preventing passage of the electrons of the flooding beam which are directed at the first of said interlaced fields while permitting passage of electrons of said flooding beam directed at the second interlaced field and then permitting passage of electrons of said beam which are directed at said first field while preventing passage of electrons of said beam which are directed at said second field.

11. The combination of elements set forth in claim 10 further including means for synchronizing the last-mentioned means of that claim with the scanning rate for preventing passage of the flooding beam electrons directed at each interlaced field only while the pencil beam is scanning that field.

12. A cathode ray tube comprising a luminescent screen, a first electron gun for producing a flooding beam and projecting said beam along a predetermined path for interception by said screen, a storage grid extending substantially transversely across said flooding beam at a position between said gun and said luminescent screen, a modulating grid for receiving an input television signal whose elements correspond to a succession of still pictures, said modulating grid extending substantially transversely across said flooding beam and positioned adjacent the control grid at a point along said beam between said control grid and said electron gun, a second electron gun for producing a pencil beam and for projecting said pencil beam for interception by said storage grid, electron deflection means for sweeping said pencil beam across the surface of said storage grid in an interlaced scan whereby there is stored on said surface a charge pattern which corresponds to the variations of the television signal applied to said modulating grid, means for synchronizing the scanning rate with said television signal for storing two complete pictures during each scan, one in the first interlaced field of the scan and the other in the second interlaced field of the scan, means including a plurality of control electrodes adjacent said storage grid on the opposite side from said modulating grid and similarly extending substantially transversely across the flooding beam for alternately preventing passage of the flooding beam electrons which have passed the first of said interlaced fields and permitting passage of the flooding beam electrons which have passed the second interlaced field and then permitting passage of said flooding beam electrons which have passed said one field while preventing passage of said flooding beam electrons which have passed the second field, and means for synchronizing said last-mentioned means with the television signal for preventing passage of the flooding beam electrons which have passed each interlaced field only when the pencil beam is scanning that field.

13. A cathode ray tube comprising a first electron gun for producing a flooding beam and for projecting said beam along a predetermined path, and, spaced in turn along said path, a modulating grid for receiving an input television signal whose elements correspond to a succession of still pictures, a storage grid, a plurality of control electrodes lying in a plane substantially parallel to said storage grid, an accelerating anode, and a luminescent screen; a second electron gun for producing a pencil beam and for projecting said pencil beam against said storage grid, deflecting means for sweeping said pencil beam across the surface of said storage grid in an interlaced scan whereby there is stored on said surface a charge pattern which corresponds to the variations of the television signal applied to said modulating grid, means for synchronizing the scanning rate with said television signal for storing two complete pictures during each scan, one in the first interlaced field of the scan and the other in the second interlaced field of the scan, certain ones of said control electrodes being aligned with the first interlaced field to form a first set and other control electrodes being aligned with the second interlaced scan to form a second set interleaved with the first set, a potential source, switching means interconnecting said control electrode sets with said potential source, and means for synchronizing said swiching means with the scanning rate of the pencil beam for increasing the potential of the first set of control electrodes and decreasing the potential of the second set while the pencil beam is scanning said second interlaced field for permitting passage of flooding beam electrons which have passed the first field and preventing passage of flooding beam electrons which have passed the second field, and then decreasing the potential of said first set of control electrodes and increasing the potential of the second set while the pencil beam is scanning the first interlaced field for preventing passage of flooding beam electrons which have passed said first field while permitting passage of flooding beam electrons which have passed the second field.

14. A cathode ray display tube of the storage type comprising a first electron gun for generating a flooding beam and for projecting said beam along a predetermined path, a perforated storage surface extending substantially transversely across said flooding beam, a modulating grid located adjacent the storage surface and between the storage surface and the electron gun for receiving a television signal whose elements correspond to a succession of still pictures, a second electron gun for generating a pencil beam and for projecting said pencil beam against the storage surface, electron deflection means for sweeping said pencil beam across said storage surface in an interlaced scan, the time of each field of said interlaced scan being equal to the duration of the signal elements corresponding to one complete picture of the television signal whereby there is stored on the storage surface two complete pictures, one in each of said fields, a luminescent viewing screen extending substantially transversely across said flooding beam path at a point downstream of the storage surface for excitation thereof by impinging electrons of said flooding beam, and means for displaying on said screen only one of the two stored pictures at a time, said last-mentioned means including a plurality of control electrodes located along the path of the flooding beam between the storage surface and the luminescent screen, and potential means for biasing said control electrodes to permit passage of the electrons of the flooding beam which have passed one of the stored pictures and to prevent passage of electrons of the flooding beam which have passed the other stored picture.

References Cited in the file of this patent

UNITED STATES PATENTS

| | | |
|---|---|---|
| 2,706,246 | Klemperer | Apr. 12, 1955 |
| 2,728,872 | Smith | Dec. 27, 1955 |
| 2,761,089 | Haeff | Aug. 28, 1956 |
| 2,788,466 | Hansen | Apr. 9, 1957 |